United States Patent
Beppu et al.

(10) Patent No.: US 8,034,241 B2
(45) Date of Patent: Oct. 11, 2011

(54) SPIRAL MEMBRANE MODULE

(75) Inventors: Masashi Beppu, Ibaraki (JP); Yasuhiro Uda, Ibaraki (JP); Shinichi Chikura, Ibaraki (JP); Kentaro Yamamoto, Kyoto (JP)

(73) Assignees: Nitto Denko Corporation, Ibaraki-shi, Osaka (JP); National University Corporation Kyoto Institute of Technology, Kyoto-shi, Kyoto (JP)

( * ) Notice: Subject to any disclaimer, the term of this patent is extended or adjusted under 35 U.S.C. 154(b) by 736 days.

(21) Appl. No.: 12/158,654

(22) PCT Filed: Dec. 21, 2006

(86) PCT No.: PCT/JP2006/325470
§ 371 (c)(1),
(2), (4) Date: Jun. 20, 2008

(87) PCT Pub. No.: WO2007/072897
PCT Pub. Date: Jun. 28, 2007

(65) Prior Publication Data
US 2009/0277825 A1 Nov. 12, 2009

(30) Foreign Application Priority Data

Dec. 22, 2005 (JP) ................. 2005-370208

(51) Int. Cl.
*B01D 63/10* (2006.01)
*B01D 63/00* (2006.01)
(52) U.S. Cl. ............... 210/321.74; 210/200; 210/201; 210/203; 210/232; 210/321.76; 210/321.83; 210/321.85; 210/322; 210/323.1
(58) Field of Classification Search ............ 210/200, 210/201, 203, 232, 321.74, 321.76, 321.83, 210/321.85, 322, 323.1
See application file for complete search history.

(56) References Cited

U.S. PATENT DOCUMENTS 5,538,642 A * 7/1996 Solie ..................... 210/652
(Continued)

FOREIGN PATENT DOCUMENTS

| EP | 0 943 367 | 9/2005 |
|----|-----------|--------|
| JP | 11-207156 | 8/1999 |
| JP | 11-267468 | 10/1999 |
| JP | 11-267469 | 10/1999 |
| JP | 2000-093761 | 4/2000 |

(Continued)

OTHER PUBLICATIONS

International Search Report issued on the corresponding PCT Application No. PCT/JP2006/325470, dated Feb. 20, 2007.

*Primary Examiner* — John Kim
(74) *Attorney, Agent, or Firm* — Knobbe Martens Olson & Bear LLP

(57) ABSTRACT

A spiral membrane module where membrane elements are easily connected to each other and the connection thereof is prevented from being loosened. The spiral membrane elements (20) are each formed in multiple layers by winding membranes and channel materials around a center tube (3) having holes and are received in a pressure vessel (10) such that they are connected in series with connection mechanisms (J) placed between the membrane elements (20). Each connection mechanism (J) has a movable member (M) installed at either the upstream side end part or the downstream side end part of each membrane element (20) and having an engagement part (9d) engageable with the other of the upstream side end or the downstream side end. The movable member (M) has a contact part (9c) coming into contact with the inner wall (10a) of the pressure vessel (10) and locking the engagement by the engagement part (9d).

13 Claims, 11 Drawing Sheets

U.S. PATENT DOCUMENTS

| | | | |
|---|---|---|---|
| 5,681,467 A * | 10/1997 | Solie et al. | 210/486 |
| 5,851,267 A * | 12/1998 | Schwartz | 96/7 |
| 6,224,767 B1 | 5/2001 | Fujiwara et al. | |
| 6,632,356 B2 * | 10/2003 | Hallan et al. | 210/321.6 |

FOREIGN PATENT DOCUMENTS

| | | |
|---|---|---|
| JP | 2004-536703 | 12/2004 |
| WO | WO 03/011441 A1 | 2/2003 |

* cited by examiner

[FIG.1]
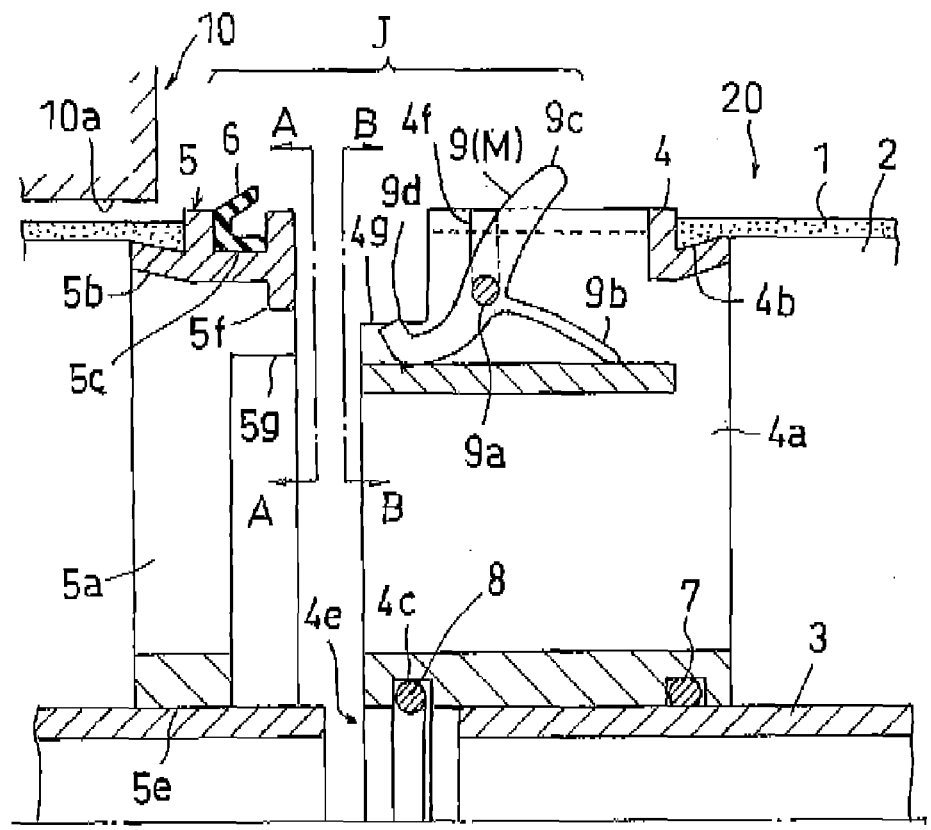
[FIG.2]
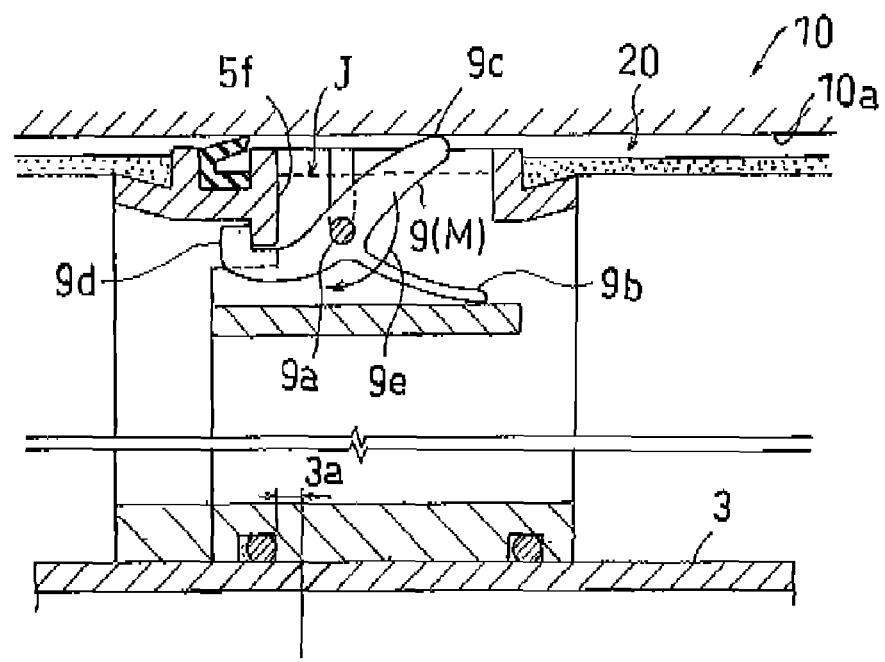

[FIG.3]
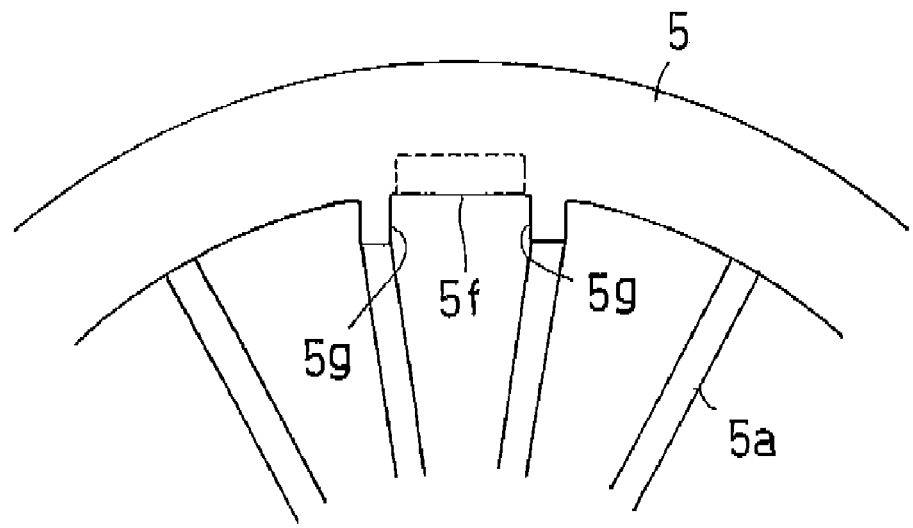
[FIG.4]
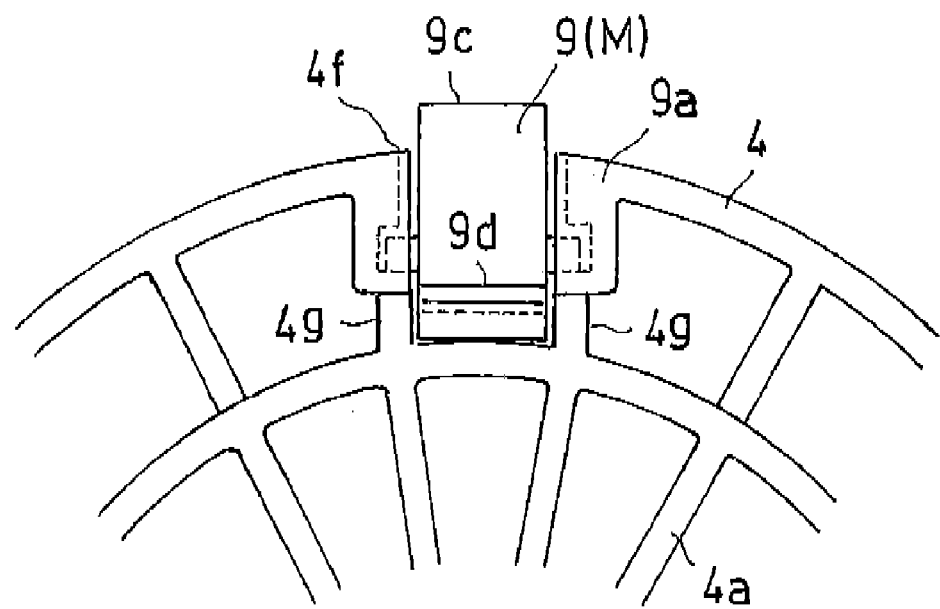

[FIG.5]
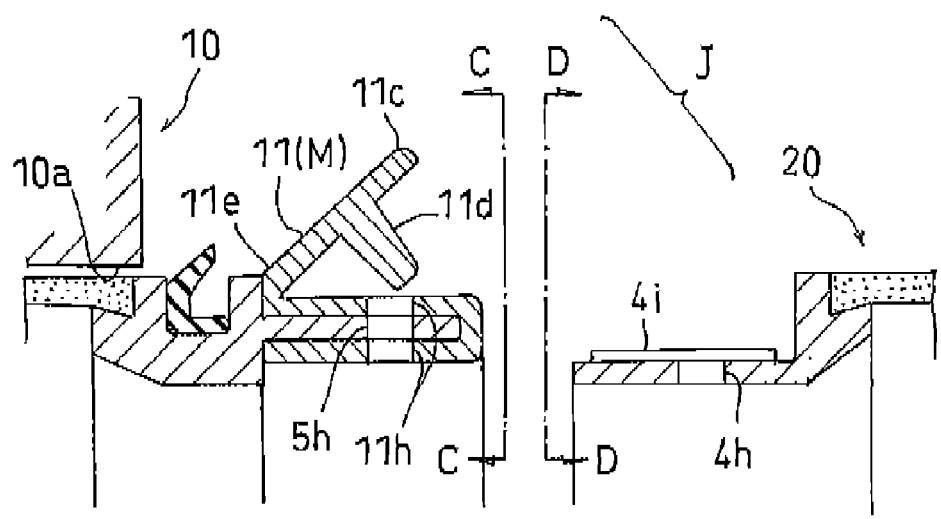
[FIG.6]
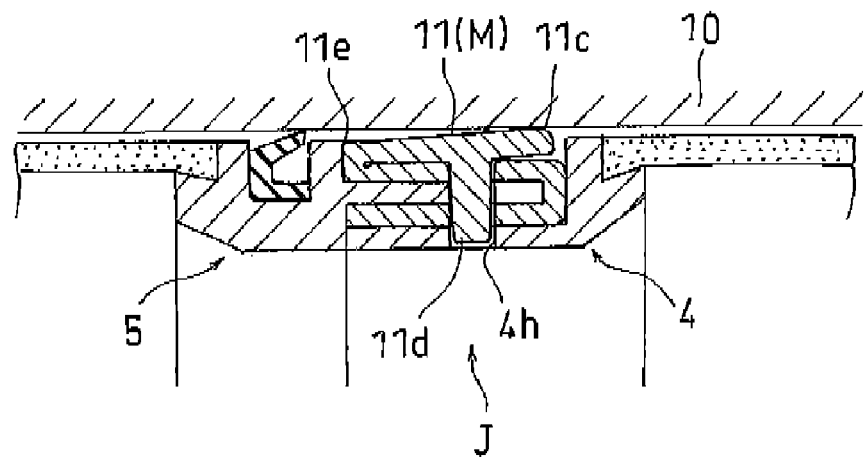

[FIG.7]
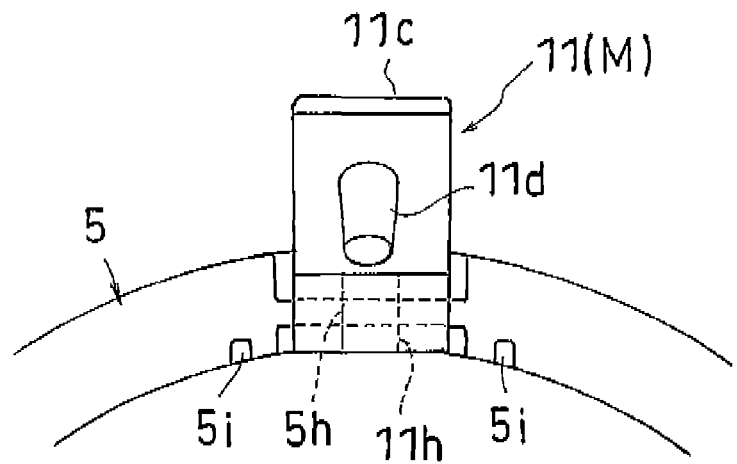
[FIG.8]
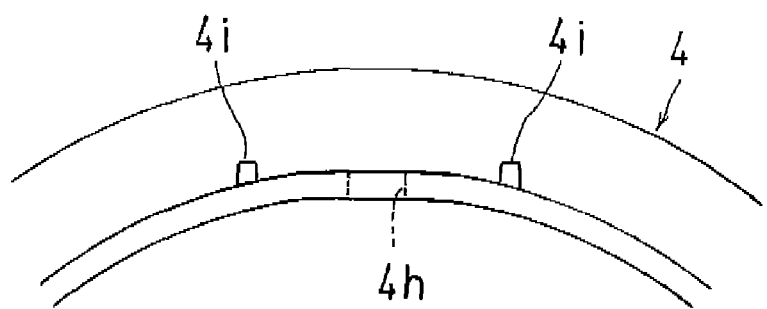
[FIG.9]
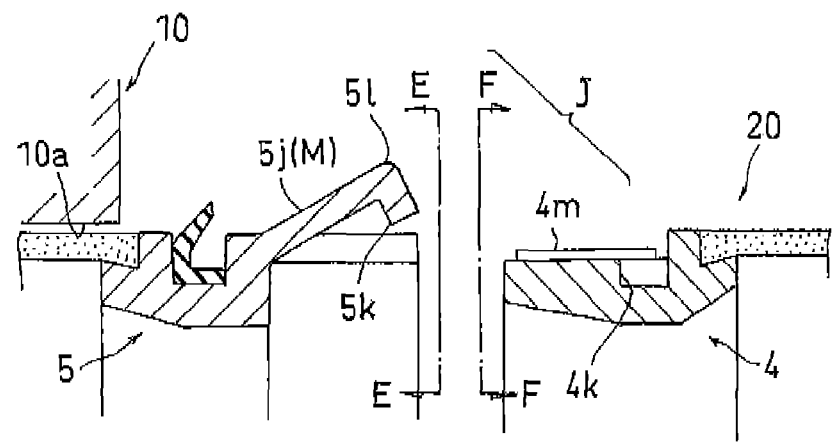

[FIG.10]
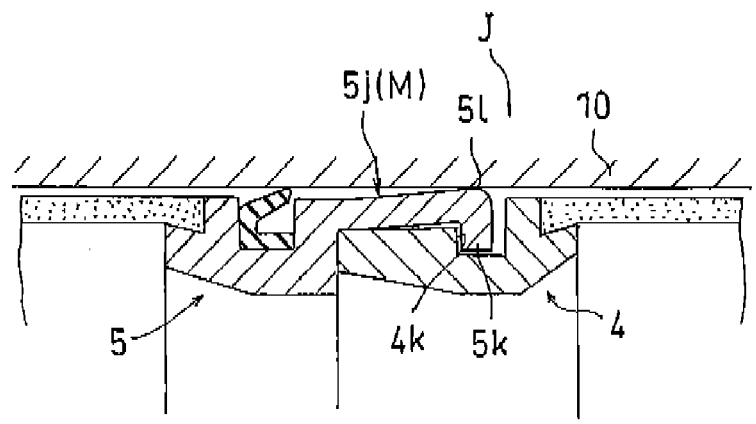
[FIG.11]
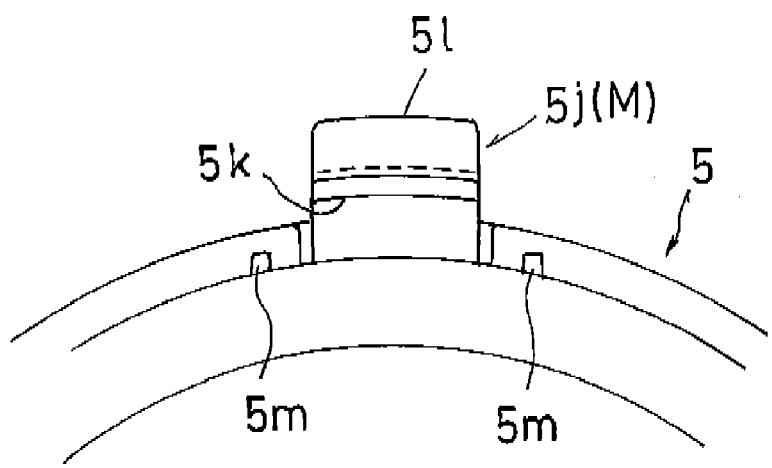
[FIG.12]
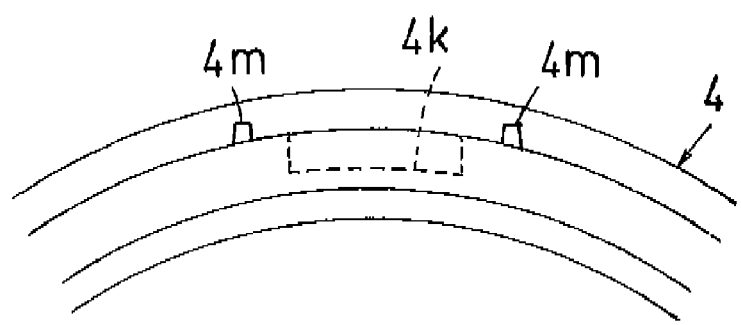

[FIG. 13]
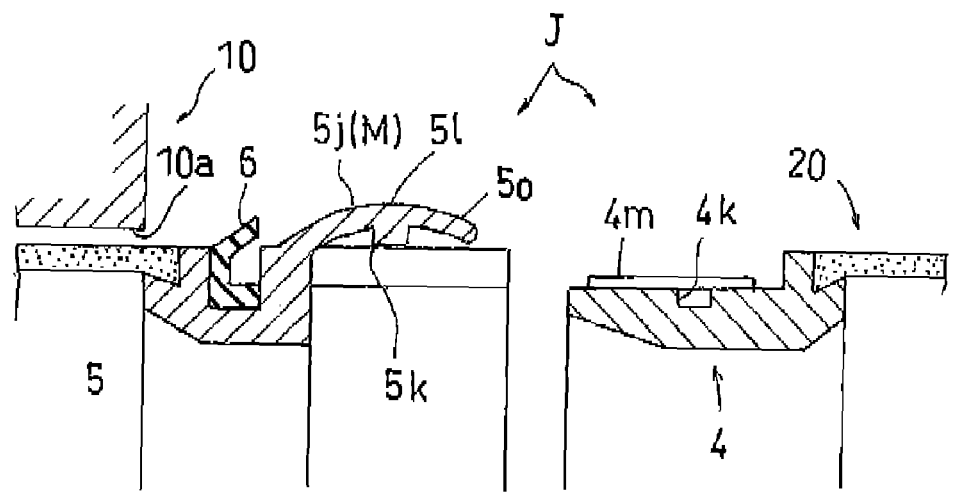
[FIG. 14]
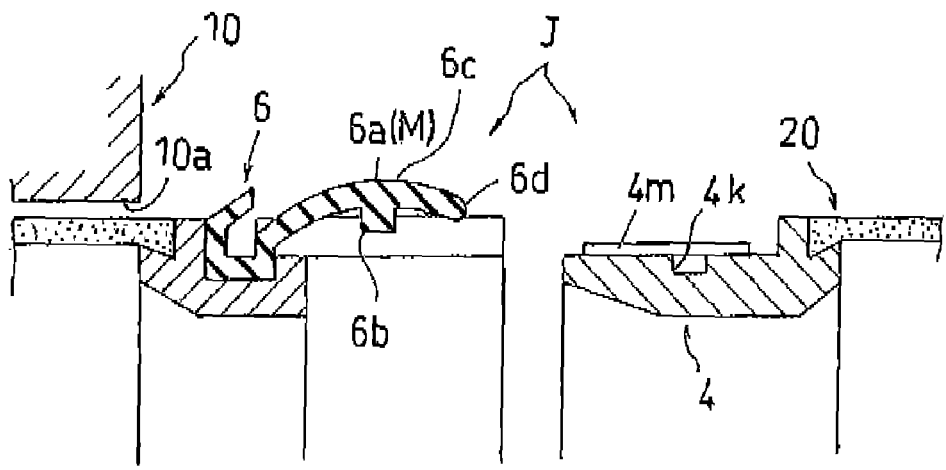

[FIG.15]
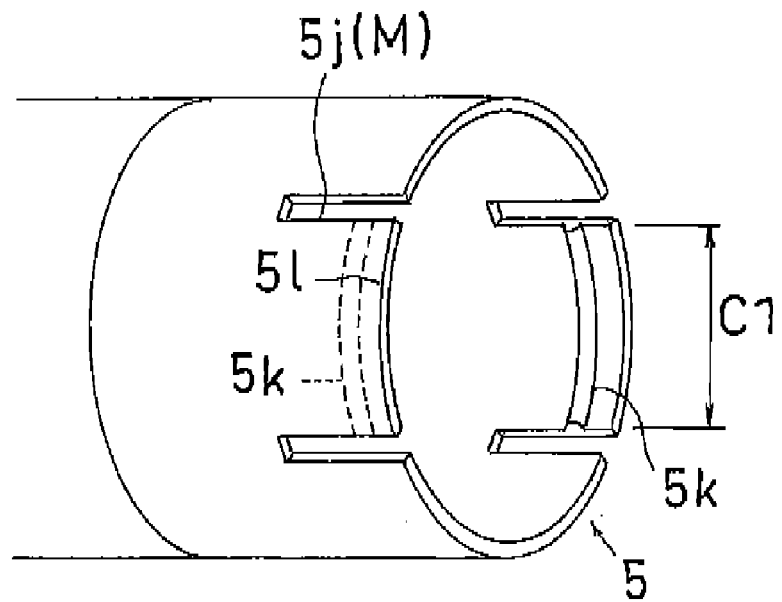
[FIG.16]
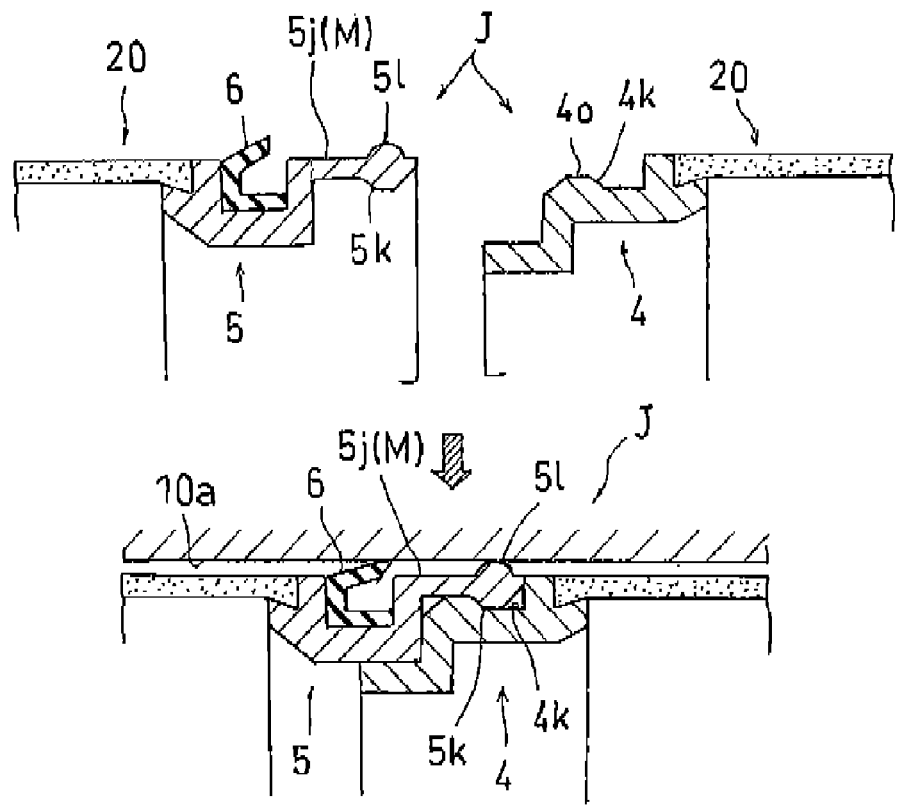

[FIG.17]
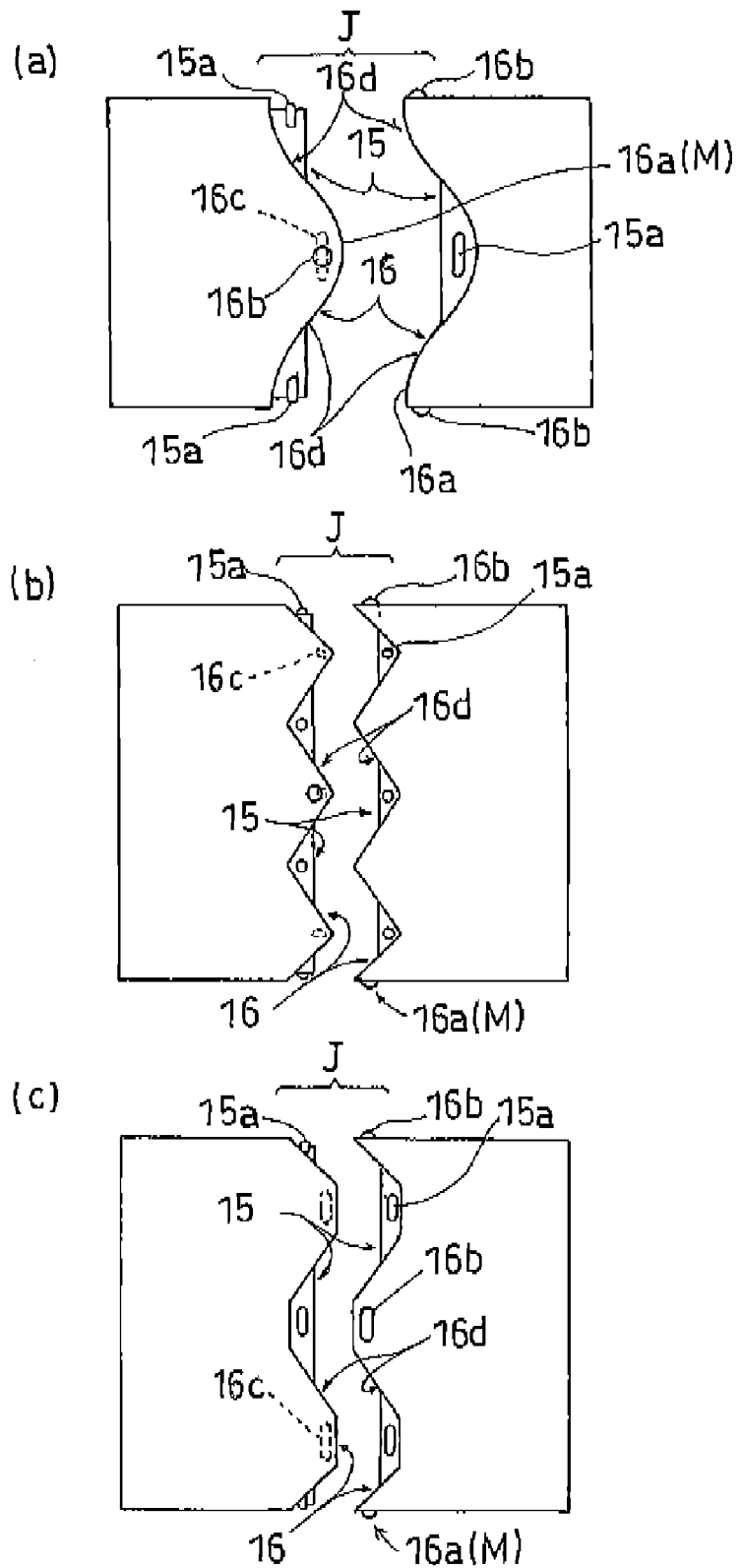

[FIG.18]
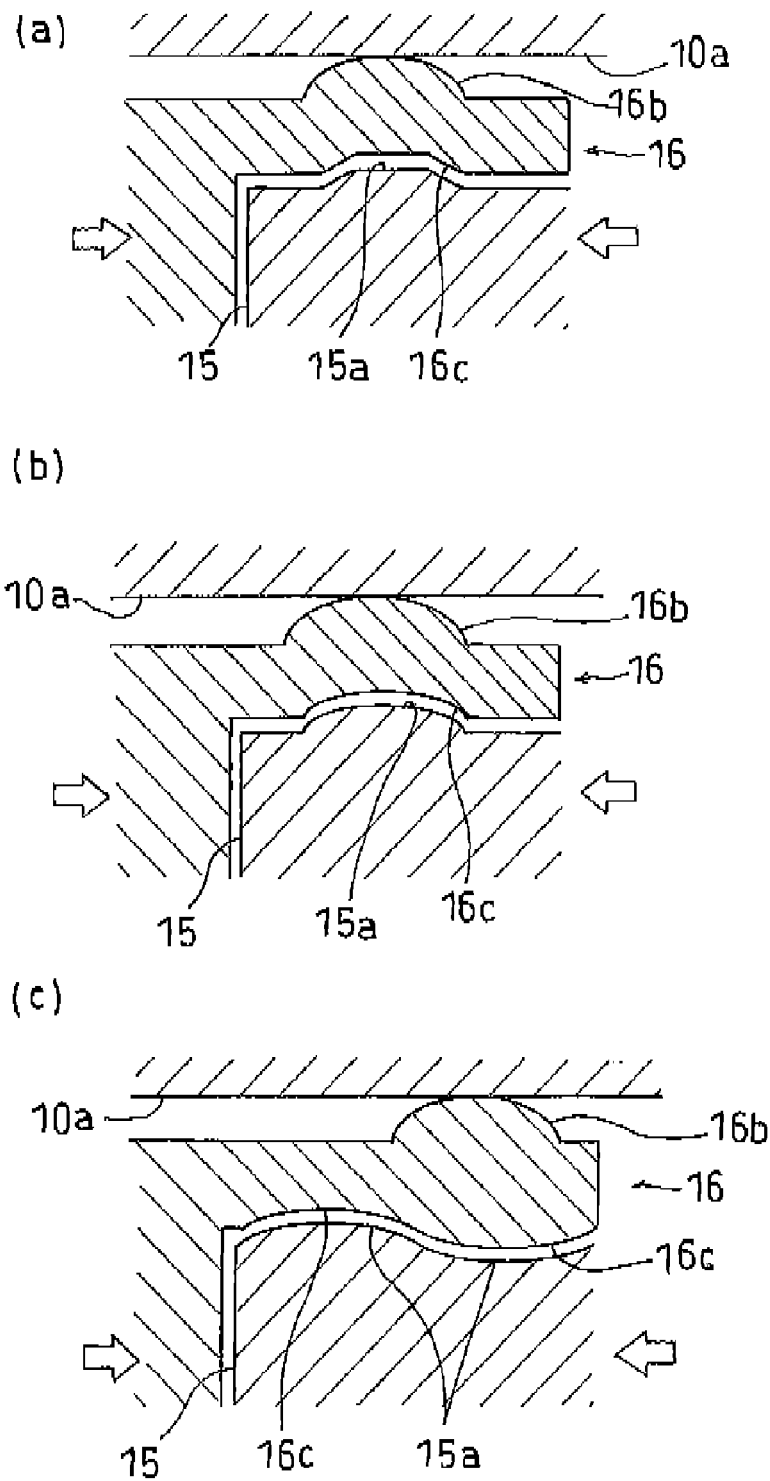

[FIG.19]
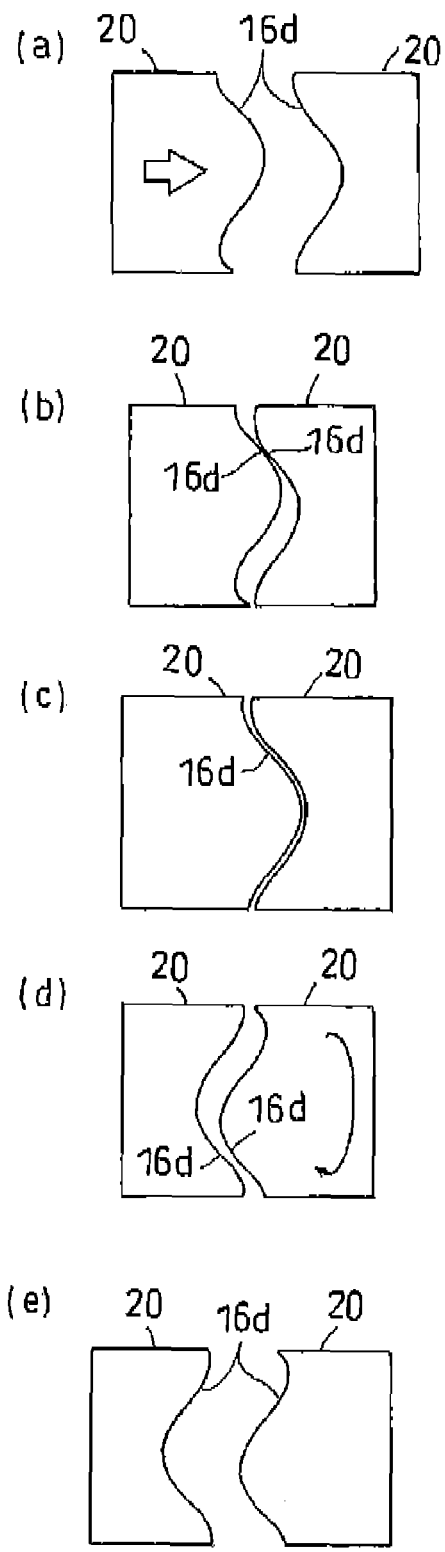

[FIG.20]
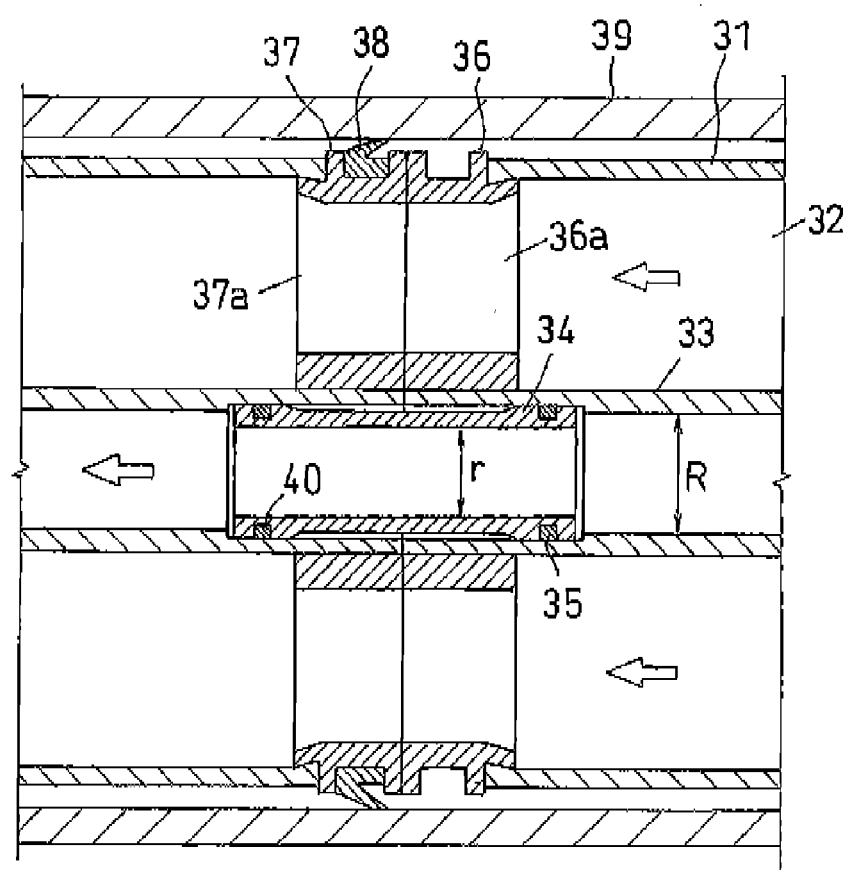
Prior Art

US 8,034,241 B2

SPIRAL MEMBRANE MODULE

This application is the U.S. National Phase under 35 U.S.C. §371 of International Application No. PCT/JP2006/325470, filed Dec. 21, 2006, which claims priority to the Japanese Patent Application No. 2005-370208, filed Dec. 22, 2005. The International Application was not published in English under PCT Article 21(2).

TECHNICAL FIELD

The present invention relates to a spiral membrane module in which a plurality of spiral membrane elements for separating components dissolved or otherwise present in liquid are connected through the intermediary of a connection mechanism and received in a pressure vessel.

BACKGROUND ART

A spiral membrane module generally has a structure such that a plurality of spiral membrane elements are connected and received in a pressure vessel (See, for example, Patent Document 1). This separation membrane element has, as a basic structure thereof, a structure such that a single or a plurality of laminates of separation membrane units made of a two-folded membrane leaf having a feed-side channel material sandwiched on the separation layer side of the membrane and a permeate-side channel material adjacent thereto are wound around a center tube having holes.

FIG. 20 shows a cross-sectional view of an element connection part of a conventional separation membrane module. As shown in this Figure, telescope prevention members 36, 37 are installed at both ends of a separation membrane unit 32. An FRP (outer cladding material) 31 is wound on the outside of the separation membrane unit 32. The FRP 31 is made integral with the separation membrane unit 32 and the telescope prevention members 36, 37 by being hardened.

Hub plates 36a, 37a are installed in the telescope prevention members 36, 37, respectively. In actually performing the fluid separation, a force deriving from the pressure difference between the feed side and the concentration side thereof acts in a direction from the feed side to the concentration side of the separation membrane element. This force is held by the telescope prevention member 36 installed on the concentration side. This prevents the separation membrane unit 32 from generating a telescope phenomenon. Further, the above-described telescope prevention member 37 has also a function of holding a supplied liquid sealing member 38. The supply liquid sealing member 38 seals a gap between the pressure vessel 39 and the FRP 31.

In the case of connecting the separation membrane units 32 with each other in series, a coupler 34 serving as a connection tube capable of being inserted into a center tube 33 is inserted into the center tube 33, whereby the two are connected. An O-ring 35 is installed respectively on the inner circumferential surface near both ends of the center tube 33. Also, an annular groove 40 capable of holding the above-described O-ring 35 is installed near both ends of the coupler 34. A separation membrane module having this structure reduces the telescope phenomenon.

However, since the separation membrane elements are not fixed to each other, a relative displacement is generated mutually in the axial direction at the time of start and stop of the operation, whereby the O-ring 35 is liable to slide on the inner surface of the center tube 33. Since this results in the abrasion of the O-ring 35, leakage is generated from the feed side to the permeate side, thereby inviting a risk of contaminating the water quality. Also, since the inner radius r of the coupler 34 is smaller than the inner radius R of the center tube 33, the coupler 34 acts as a resistance against the flow of the transmitted liquid. As a result thereof, there arises a problem of large pressure loss of the permeate-side channel.

In order to solve such a problem, Patent Document 2 described below discloses a connection structure of elements that can compress the O-ring by holding the O-ring on the abutting surface at the end parts of the center tube and installing an engagement part in the hub of the telescope prevention member (cap) so as to fasten the elements with each other. With this connection structure, the abrasion of the O-ring can be prevented by preventing the relative displacement between the elements, whereby the pressure loss in the permeate-side channel can be reduced.

However, with this connection structure, there is a need to prevent loosening of the engagement part due to the pressure change or the like caused by the start or stop of the operation. This raises a problem in that, according as the engagement part of the telescope prevention member is made less liable to be loosened, the operation of the engagement connection or the operation of the connection release will be more cumbersome.

Patent Document 1: Japanese Patent Application Laid-Open Publication No. H11-267469

Patent Document 2; Japanese Patent Application Laid-Open Publication No. 2004-536703

DISCLOSURE OF THE INVENTION

Problems to be Solved by the Invention

Therefore, an object of the present invention is to provide a spiral membrane module in which the membrane elements can be easily connected with each other, and moreover the loosening or release of the connection is not occurred at the time of operation.

Means for Solving the Problems

The aforementioned object can be achieved by the present invention such as described below.

That is, the spiral membrane module of the present invention is a spiral membrane module in which a plurality of spiral membrane elements each formed in multiple layers by winding membranes and channel materials around a center tube having holes are received in a pressure vessel while being connected in series through the intermediary of connection mechanisms, wherein the connection mechanism has a movable member installed at either the upstream side end part or the downstream side end part of the membrane element and having an engagement part engageable with the other of the upstream side end or the downstream side end, and the movable member has a contact part coming into contact with the inner wall of the pressure vessel and locking the engagement by the engagement part.

According to the present invention, a movable member having an engagement part is provided as a connection mechanism that restrains the relative displacement of adjacent membrane elements with each other, and the movable member has a contact part coming into contact with the inner wall of the pressure vessel and looking the engagement. Therefore, by simply allowing the membrane elements to be received into the pressure vessel in a state in which the engagement part is engaged, the membrane elements can be easily connected with each other, and moreover the connection is not loosened or released during the operation.

In the above, the above-described connection mechanism is preferably provided with a release mechanism that releases the engagement by the above-described engagement part in a state in which the above-described contact part is not in contact with the inner wall. With this construction, by simply allowing the membrane elements to be received into the pressure vessel, the membrane elements can be easily connected with each other and, conversely, by simply taking the membrane elements out from the pressure vessel, the connection between the membrane elements can be released.

Also, the above-described movable member is preferably a lever member having a flexible part that releases the above-described engagement by elastic restoration force. With this construction, the engagement and the release of the engagement part can be carried out with a simple structure by deformation of the flexible part.

Further, the above-described upstream-side end part and the above-described downstream-side end part that are connected each preferably have a guide inclination part that guides the engagement part of the above-described movable member to the engagement part of the opposite side by relative rotation of the two. By providing a guide inclination part each in the above-described upstream-side end part and the above-described downstream-side end part, the engagement part is guided because relative rotation is generated by the guide inclination part when the two are made to abut against each other and pressed into the pressure vessel even in a state in which the positions of the engagement parts with each other is shifted a little, whereby the engagement of the two can be carried out smoothly.

Also, apart from the above-described connection mechanism, a lock mechanism is preferably provided that is operated by receiving the flow of liquid so as to suppress the separation between the upstream side end part and the downstream side end part of the above-described membrane elements. With this construction, the lock mechanism is operated by the flow of liquid that is generated at the time of use of the membrane module, whereby the separation of the membrane element end parts can be suppressed. Therefore, in combination with the lock provided by the contact part described above, the membrane element end parts can be connected and fixed in a double manner.

BRIEF DESCRIPTION OF THE DRAWINGS

FIG. 1 is a cross-sectional view of an essential part showing one example of a connection mechanism of a spiral membrane module of the present invention (non-connected state).

FIG. 2 is a cross-sectional view of an essential part showing one example of a connection mechanism of a spiral membrane module of the present invention (connected state).

FIG. 3 is an enlarged view of the essential part showing an A-A arrow view in FIG. 1.

FIG. 4 is an enlarged view of the essential part showing a B-B arrow view in FIG. 1.

FIG. 5 is a cross-sectional view of an essential part showing another example of a connection mechanism of a spiral membrane module of the present invention (non-connected state).

FIG. 6 is a cross-sectional view of an essential part showing another example of a connection mechanism of a spiral membrane module of the present invention (connected state).

FIG. 7 is an enlarged view of the essential part showing a C-C arrow view in FIG. 5.

FIG. 8 is an enlarged view of the essential part showing a D-D arrow view in FIG. 5.

FIG. 9 is a cross-sectional view of an essential part showing another example of a connection mechanism of a spiral membrane module of the present invention (non-connected state).

FIG. 10 is a cross-sectional view of an essential part showing another example of a connection mechanism of a spiral membrane module of the present invention (connected state).

FIG. 11 is an enlarged view of the essential part showing an E-E arrow view in FIG. 9.

FIG. 12 is an enlarged view of the essential part showing an F-F arrow view in FIG. 9.

FIG. 13 is a cross-sectional view of an essential part showing another example of a connection mechanism of a spiral membrane module of the present invention (non-connected state).

FIG. 14 is a cross-sectional view of an essential part showing another example of a connection mechanism of a spiral membrane module of the present invention (non-connected state).

FIG. 15 is a perspective view of an essential part showing another example of a connection mechanism of a spiral membrane module of the present invention.

FIG. 16 is a cross-sectional view of an essential part showing another example of a connection mechanism of a spiral membrane module of the present invention.

FIG. 17 is a cross-sectional view of an essential part showing another example of a connection mechanism of a spiral membrane module of the present invention (non-connected state).

FIG. 18 is a cross-sectional view of an essential part showing another example of an engagement part of a spiral membrane module of the present invention (connected state).

FIG. 19 is a descriptive view for describing the operations of connection and release of the spiral membrane module of the present invention.

FIG. 20 is a cross-sectional view of an essential part showing an example of a connection mechanism of a conventional spiral membrane module.

DESCRIPTION OF THE SYMBOLS

1 FRP
2 Separation membrane unit
3 Center tube
4 Telescope prevention member
4h Hole (engagement part)
4k Engagement part
5 Fit-in member
5f Engagement part
5j Lever part
5k Engagement part
9 Lever member
9a Fulcrum
9b Flexible part
9c Contact part
9d Engagement part
10 Pressure vessel
10a Inner wall
11 Lever member
11c Contact part
11d Fit-in part
15 Inside fit-in part
15a Engagement part
16 Outside fit-in part
16a Protrusion part
16b Contact part
16c Engagement part
16d Guide inclination part 20 Membrane element
J Connection mechanism
M Movable member

BEST MODE FOR CARRYING OUT THE
INVENTION

Hereinafter, embodiments of the present invention will be described with reference to the drawings. FIG. 1 is a cross-sectional view of an essential part showing one example of a connection mechanism of a spiral membrane module of the present invention (non-connected state), and FIG. 2 shows a connected state thereof. In addition, FIG. 3 is an enlarged view of the essential part showing an A-A arrow view in FIG. 1, and FIG. 4 is an enlarged view of the essential part showing a B-B arrow view. Note that, for simplifying the description, some parts have been illustrated by being subjected to enlargement, shrinkage, or the like.

As shown in FIG. 2, the spiral membrane module of the present invention is such that a plurality of spiral membrane elements 20 (hereinafter referred to as "membrane elements") each formed in multiple layers by winding membranes and channel materials around a center tube 3 having holes are received in a pressure vessel 10 while being connected in series through the intermediary of a connection mechanism J. The present invention is characterized in the connection mechanism J of the membrane element 20, so that regarding the other constructions related to the membrane module, any of the conventionally known ones can be adopted.

The membrane element 20 has a structure in which a separation membrane unit 2 made of a membrane and a channel material is wound around the center tube 3 having holes. The separation membrane unit 2, for example, has a structure such that membrane leaves constructed to arrange feed-side channel materials between two-folded separation membranes and permeate-side channel materials are alternately superposed. For such a membrane element 20, any of the conventionally known separation membranes, permeate-side channel materials, feed-side channel materials, center tubes 3, and the like can be adopted.

For example, when a plurality of feed-side channel materials and permeate-side channel materials are used, it will be a structure in which a plurality of membrane leaves are wound around the center tube 3. On the outside of the membrane element 20, an FRP1 being a fiber reinforced resin is formed as an outer cladding material. Also, a plurality of the membrane elements 20 are connected and received in a pressure vessel 10.

As shown in FIG. 1, a telescope prevention member 4 is installed on the concentration side of the separation membrane unit 2. The telescope prevention member 4 prevents deformation of the membrane element 20 into a telescope shape. A through-hole 4e through which the center tube 3 can be passed is provided in the telescope prevention member 4, and the end part on the concentration side of the center tube 3 is inserted into the through-hole 4e. Also, hub plates 4a are provided in the telescope prevention member 4 with the through-hole 4e serving as a center.

An O-ring 7 is provided on the inner circumferential surface of the through-hole 4e of the telescope prevention member 4 so as to keep water-tightness with the center tube 3. By providing the O-ring 7, the supplied liquid and the transmitted liquid can be prevented from being mixed, thereby improving the separation performance. Also, an annular groove 4c is provided on the inner circumferential surface of the through-hole 4e in the radial direction of the O-ring 7. Here, adhesion, supersonic wave welding, friction welding, or the like can also be applied for keeping the water-tightness of the telescope prevention member 4 and the center tube 3.

Also, a fit-in member 5 capable of being fitted into the telescope prevention member 4 is provided on the feed side of the separation membrane unit 2. By being fitted into the telescope prevention member 4, the fit-in member 5 enables series connection of the membrane elements. A through-hole 5e through which the center tube 3 can be passed is provided in the fit-in member 5, and the end part on the feed side of the center tube 3 passes through the through-hole 5e and is inserted in a partially protruding state. Also, hub plates 5a are provided in the fit-in member 5 with the through-hole 5e serving as a center.

An annular groove 5c is provided on the outer circumferential side of the fit-in member 5. An annular seal member 6 that seals the gap between the pressure vessel 10 and the membrane element 20 is held in the annular groove 5c. The seal member 6 has an annular shape protruding in the radial direction and extending in the circumferential direction, and is brought into a state of being in close adhesion with the inner wall 10a of the pressure vessel 10. In order to establish close adhesion with the pressure vessel 10, the seal member 6 is preferably made of elastic substance.

At the time of fit-in, the part of the center tube 3 that protrudes from the fit-in member 5 to the feed side is inserted into the through-hole 4e of the telescope prevention member 4. An O-ring 8 and a radial-direction annular groove 4c capable of inserting this are provided in the through-hole 4e. By providing the O-ring 8, the water-tightness with the center tube 3 can be kept. Since the telescope prevention member 4 and the fit-in member 5 are connected so as to restrain the relative displacement as will be described later, the relative displacement between the O-ring 8 and the center tube 3 is also restrained, whereby abrasion is prevented. Also, since the relative displacement is restrained, the lap length 3a of the O-ring can be made short, so that the seal position of the O-ring can be moved to the outer circumferential surface of the center tube 3 by abolishing the coupler. Since the need for connection means such as a coupler is eliminated, there will be no narrow part of the permeate-side channel, thereby reducing the pressure loss. Also, the number of components and the costs for materials can be reduced.

The telescope prevention member 4 and the fit-in member 5 are provided with a lap part 4b and a lap part 5b, respectively, and are fixed to the membrane element 20 by winding the parts with the FRP 1. By this, the separation membrane element 2 is integrated with the telescope prevention member 4 and the fit-in member 5.

The spiral membrane module of the present invention is characterized in that the above-described connection mechanism has a movable member installed at either the upstream side end part or the downstream side end part of the above-described membrane element and having an engagement part engageable with the other of the upstream side end or the downstream side end, and the movable member has a contact part coming into contact with the inner wall of the above-described pressure vessel and locking the engagement by the above-described engagement part. In the present embodiment, as shown in FIGS. 1 to 4, an example is shown in which a movable member M constituting a connection mechanism J is a lever member 9 installed in the telescope prevention member 4 corresponding to the downstream-side end part of the membrane element 20, and this lever member 9 has an engagement part 9d engageable with the fit-in member 5 corresponding to the upstream-side end part.

This lever member 9 is inserted and attached along a guide groove 4f installed in the telescope prevention member 4. The tip end of the guide groove 4f widens so as to be capable of holding the lever member 9 in a freely rotatable manner. That is, the lever member 9 has a rotation mechanism, and performs rotation operation by contact with the inner wall 10a of the pressure vessel 10 at the time of mounting to the pressure vessel 10.

The lever member 9 has a fulcrum 9a approximately at the center thereof, has an engagement part 9d at the downstream-side end part, has a contact part 9c at the other end thereof, and has a flexible part 9b that is branched from near the fulcrum 9a. The contact part 9c has a function of locking the engagement by the engagement part 9d by coming into contact with the inner wall 10a of the pressure vessel 10.

Also, the flexible part 9b of the lever member 9 has a function of releasing the engagement by elastic restoration force. That is, the connection mechanism J of the present embodiment is provided with a release mechanism that releases the engagement by the engagement part 9d in a state in which the contact part 9c is not in contact with the inner wall 10a.

The connection operation by the lever member 9 will be described below. On the outside of the pressure vessel 10, the guides 4g of adjacent telescope prevention members 4 are positioned and fit between the guides 5g of the fit-in member 5. Thereafter, at the time of mounting the fit-in part into the pressure vessel 10, the contact part 9c of the lever member 9 comes into contact with the inner wall 10a of the pressure vessel 10 to be pressed down, whereby the flexible part 9b of the lever member 9 is warped, and the lever member 9 is rotated in the direction of an arrow 9e with the fulcrum 9a serving as a center. At that time, the engagement part 9d of the lever member 9 is engaged with the engagement part 5f of the fit-in member 5 to complete the lock.

In taking the membrane element 20 out from the pressure vessel 10, by the action of the flexible part 9b of the lever member 9, the lever member 9 is rotated in a direction opposite to the arrow 9e, whereby the lock is automatically released. In a series of operations for operating the lock mechanism, there is no need for extraneous operations as compared with the work of mounting a conventional membrane element.

The lever member 9 may be made of the same material as the flexible part 9b and, in that case, it is preferably made of a soft and flexible resin material having a high strength, such as polypropylene. Also, the flexible part 9b can be formed with a leaf spring or the like.

Other Embodiments (1) In the above-described embodiment, an example has been shown in which the movable member of the connection mechanism is constructed with a lever member supported at a fulcrum in a freely rotatable manner and having a flexible part that is branched from the fulcrum. However, in the present invention, as shown in FIGS. 5 to 8, the connection mechanism J may be constructed with use of a lever member 11 pivotable by a flexible part 11e.

In this example, the lever member 11 having a Z-letter cross-sectional shape is attached to a fit-in member 5 having a hole 5h for locking. Also, a hole that will become an engagement part 4h is formed at a corresponding position of the telescope prevention member 4.

In mounting the membrane element 20 onto the pressure vessel 10, the inner wall 10a of the pressure vessel 10 and the contact part 11c of the lever member interfere with each other, whereby the lever member 11 is pressed down, and the engagement part 11d of the lever member 11 is inserted simultaneously into the hole 11h of the lever member, into the hole 5h of the fit-in member 5, and further into the engagement part 4h of the telescope prevention member 4 (the state of FIG. 6), thereby restraining the relative displacement of the adjacent membrane elements 20 with each other.

Here, the fit-in member 5 may be provided with a recess part 5i, and the telescope prevention member may be provided with a protrusion part 4i, so as to have functions of positioning at the time of fit-in and stopping the rotation after the fit-in.

(2) Also, in the present invention, as shown in FIGS. 9 to 12, the connection mechanism J may be constructed with a movable member M having a flexible main body and being pivotable and deformable by this. At this time, the movable member M may be constructed with a lever part that is formed integrally with the fit-in member 5.

In this example, the lever part 5j integrally formed with the fit-in member 5 is pressed down by contact of the contact part 5l at the time of mounting into the pressure vessel 10, whereby the engagement part 5k at the lever part 5j tip end and the engagement part 4k installed in the adjacent telescope prevention member 4 are firmly engaged with each other (the state of FIG. 10), thereby restraining the relative displacement between adjacent membrane elements 20.

Here, the fit-in member may be provided with a recess part 5m, and the telescope prevention member may be provided with a protrusion part 4m, so as to have functions of positioning at the time of fit-in and stopping the rotation after the fit-in.

(3) In each of the above-described embodiments, an example has been shown in which the movable member has a lever-shaped member; however, the movable member in the present invention may include a button-shaped member. For example, in the embodiments shown in FIGS. 5 to 8, a construction may be made in which a button member biased to the outside by a coil spring may be installed instead of the lever member 11, where the lower end of the button member is made to be an engagement part engageable with the engagement part 4h of the telescope prevention member 4, and the upper end of the button member is made to be a contact part coming into contact with the inner wall 10a of the pressure vessel 10 and locking the engagement by the engagement part.

At that time, the coil spring constitutes a release mechanism that releases the engagement by the above-described engagement part in a state in which the contact part is not in contact with the inner wall.

(4) In the above-described embodiments, an example has been shown in which the connection mechanism is installed in the telescope prevention member and in the fit-in member. However, it is sufficient that the connection mechanism of the present invention connects the upstream-side end part and the downstream-side end part of adjacent membrane elements, so that those other than the combination of the telescope prevention member and the fit-in member are possible.

For example, the two need not have a fit-in structure, and may be those having a seal ring at the abutting surfaces or the like. In that case, it is preferable to install the connection mechanism in the present invention at two or more sites. Here, in the event that the connection mechanism is installed only at one site, it preferably has a structure such that at least adjacent center tubes are fit in with each other.

(5) In the above-described embodiments, an example is shown in which a movable member that is suited for a pressure vessel of end entry type having a supply inlet and a discharge outlet at the two end surfaces of the pressure vessel. However, the movable member in the present invention is preferably one that is also suited for a pressure vessel of side entry type having a supply inlet and a discharge outlet near the two ends of the body part of the pressure vessel. That is, an opening is present in the inner wall in the side entry type, so that, with the movable member of the above-described embodiment, the contact part is liable to be caught by the opening particularly in taking the membrane elements out. For this reason, a connection mechanism (in particular a movable member) is preferable such that the membrane elements can be easily taken out even if an opening is present. For such connection mechanisms, for example, those shown in FIGS. 13 to 16 may be exemplified.

First, the example shown in FIG. 13 is one in which the contact part 5*l* of the lever member 5*j* is extended further in a circular arc shape in the examples shown in FIGS. 9 to 12. That is, in constructing the connection mechanism J with use of a pivotable and deformable movable member M, an extended part 5*o* warped to the inside is installed on the tip end side, beyond the contact part 5*l*, of the lever part 5*j* that is integrally formed in the fit-in member 5. Owing to this extended part 5*o*, the contact part 5*l* will not be caught by the opening even at the time of retreat of the membrane element 20.

Next, the example shown in FIG. 14 is one in which the lever part 5*j* is extended in a circular arc shape as shown in FIG. 13, and also a movable member M integrated with an annular seal member 6 is installed. That is, in constructing the connection mechanism J with use of a pivotable and deformable movable member M, an extended part 6*d* warped to the inside is installed on the tip end side, beyond the contact part 6*c*, of the lever part 6*a* that is integrally formed in the seal member 6. Owing to this extended part 6*d*, the contact part 6*c* will not be caught by the opening even at the time of retreat of the membrane element 20.

Also, the example shown in FIG. 15 is such that, by increasing the width C1 of the movable member M to be larger than the diameter of the opening of the pressure vessel 10, the contact part 5*l* is made less liable to be caught by the opening. That is, in constructing the connection mechanism J with use of a pivotable and deformable movable member M, the width of the lever part 5*j* integrally formed with the fit-in member 5, particularly the width C1 of the contact part 5*l*, is increased to be larger than the diameter of the opening. Owing to this, the contact part 5*l* will not fall into the opening even at the time of retreat of the membrane element 20, whereby the action of being caught can be prevented.

Also, the example shown in FIG. 16 is an example in which, when the engagement part 5*k* of the movable member M comes to be engaged with the engagement part 4*k* of the telescope prevention member 4, the lever part 5*j* is deformed and the engagement part 5*k* goes over the protrusion part 4*o* to be engaged with the engagement part 4*k* and, when one attempts to release the engagement in the inside of the pressure vessel 10, the contact part 5*l* moves to the outside to come into contact with the inner wall 10*a*, whereby the engagement is locked.

That is, in this example, in a state in which the engagement part 5*k* of the movable member M is engaged, the contact part 5*l* is not in contact with the inner wall 10*a*, so that when the engagement part 5*k* attempts to go over the protrusion part 4*o*, the contact part 5*l* will come into contact with the inner wall 10*a*, thereby providing a structure such that the engagement cannot be released in the inside the pressure vessel 10. For this reason, the contact part 5*l* will not be caught by the opening even at the time of retreat of the membrane element 20.

Also, this structure provides an advantage such that, in connecting and engaging the membrane elements 20 outside the pressure vessel 10, one can really sense whether the engagement has been properly carried out or not by the touch or sound at the time when the engagement part 5*k* goes over the protrusion part 4*o*.

(6) Also, in the present invention, as shown in FIGS. 17(*a*) to 17(*c*), the upstream-side end part and the downstream-side end part that are to be connected may be each provided with a guide inclination part 16*d* that guides the engagement part 16*c* of the movable member M to the engagement part 15*a* of the opposite member by relative rotation of the two. At that time, the upstream-side end part and the downstream-side end part are each preferably provided with an inner fit-in part 15 having a circular-arc-shaped outer circumferential surface and an outer fit-in part 16 capable of being fitted to this on the outside.

For example, in the example shown in FIG. 17(*a*), the upstream-side end part and the downstream-side end part are each provided with an inner fit-in part 15 having a circular-arc-shaped outer circumferential surface and an outer fit-in part 16 capable of being fitted to this on the outside and having a circular-arc-shaped inner circumferential surface, thereby constructing the connection mechanism J. In this connection mechanism J, the protrusion part 16*a* of the outer fit-in part 16 corresponds to the movable member M, and the concave engagement part 16*c* installed on the inner circumferential surface of the outer fit-in part 16 and the convex engagement part 15*a* installed on the outer circumferential surface of the inner fit-in part 15 are engaged with each other.

The cross-sectional shape of the engagement parts 15*a*, 16*c* as viewed in a front view may be any shape; however, those in which the cross-sectional shape as viewed in a front view is a trapezoid as shown in FIG. 18(*a*), those in which the cross-sectional shape as viewed in a front view is a circular arc as shown in FIG. 18(*b*), and those in which the cross-sectional shape as viewed in a front view is a combination of two concave and convex circular arcs as shown in FIG. 18(*c*) are preferable. Also, the shape of the engagement parts 15*a*, 16*c* as viewed in a plan view may be any shape; however, a circular shape, an elliptic shape, a square shape, a rectangular shape, a triangular shape, and the like may be raised as examples. The recess and the protrusion of the engagement parts 15*a*, 16*c* may be turned upside down.

Also, the movable member M constituting the outer fit-in member 16 has a contact part 16*b* coming into contact with the inner wall 10*a* of the pressure vessel 10 and locking the engagement by the engagement parts 15*a*, 16*c*. The cross-sectional shape of the contact part 16*b* as viewed in a front view may be any shape; however, a circular arc shape, a semicircular shape, a trapezoidal shape, a triangular shape, and the like are preferable. Also, the shape of the contact part 16*b* as viewed in a plan view may be any shape; however, a circular shape, an elliptic shape, a square shape, a rectangular shape, a triangular shape, and the like may be raised as examples.

In the example shown in FIG. 17(*a*), the outer fit-in part 16 of the upstream-side end part and the outer fit-in part 16 of the downstream side end part have a wave-shaped end surface, and this end surface constitutes the guide inclination part 16*d* that guides the engagement part 16*c* to the engagement part 15*a*. On the basis of FIGS. 19(*a*) to 19(*e*), the operations of connection and release of the membrane elements 20 using this guide inclination part 16*d* will be described.

In making the membrane elements 20 abut against each other and pressing into the pressure vessel in the direction of an arrow in FIG. 19(*a*), first the guide inclination parts 16*d* of the two abut against each other as shown in FIG. 19(b). By pressing further into the pressure vessel, as shown in FIG. 19(c), a relative rotation is occurred by sliding of the guide inclination parts 16 even in a state in which the positions of the engagement parts are shifted a little from each other, whereby the engagement parts are guided and the connection by engagement of the two can be carried out.

In releasing the membrane elements 20, a releasing force is generated by sliding of the guide inclination parts 16 by relative rotation of the membrane elements 20 with each other as shown in FIGS. 19(d) to 19(e), whereby the engagement by the engagement parts 15a, 16c can be released (in FIG. 19, illustration of the engagement parts 15a, 16c is omitted).

On the other hand, in the example shown in FIG. 17(b), the outer fit-in part 16 of the upstream-side end part and the outer fit-in part 16 of the downstream-side end part have an end surface of a zigzag shape having a triangular protrusion part, and this end surface constitutes the guide inclination part 16d that guides the engagement part 16c to the engagement part 15a.

Also, in the example shown in FIG. 17(c), the outer fit-in part 16 of the upstream-side end part and the outer fit-in part 16 of the downstream-side end part have an end surface of a zigzag shape having a trapezoidal protrusion part, and this end surface constitutes the guide inclination part 16d that guides the engagement part 16c to the engagement part 15a.

(7) In the above-described embodiments, an example has been shown in which the connection mechanism is installed by being fixed to the upstream-side end part and the downstream-side end part of the membrane elements; however, it is preferable to install a connection mechanism in which the position of the engagement part can be changed relative to at least one of the upstream-side end part and the downstream-side end part. By installing such a connection mechanism, in applying particularly to large-diameter membrane elements, the need for positioning by rotation or the like of the large-diameter membrane elements is eliminated, so that the connection of the membrane elements is made more easily.

As a connection mechanism in which the position of the engagement part can be changed, for example, in installing the connection mechanism J shown in FIGS. 17(a) to 17(c), a structure in which a member for connection having an engagement part 16c or an engagement part 15a is installed in a freely rotatable manner relative to at least one of the upstream-side end part and the downstream-side end part can be raised as an example. In installing the member for connection in a freely rotatable manner, it can adopt, for example, a structure in which a guide groove of the circumferential direction is installed on the outer circumference or the like of the upstream-side end part or the downstream-side end part of the membrane element, and the member for connection is constructed with a cylindrical member which is fitted to this on the outside and in which the protrusion formed on the inner circumferential surface is guided along the above-described guide groove.

Further, the connection mechanism installed in a freely rotatable manner may be constructed with a ratchet mechanism so as to allow rotation only in one direction. With this construction, the rotation of the membrane element in a reverse direction can be transmitted to the member for connection, whereby the membrane elements can be released from each other.

(8) Also, in the present invention, a lock mechanism different from the lock by the contact part may be installed so that the membrane element end parts can be connected and fixed in a double manner in combination with the above-described lock by the contact part. For example, apart from the above-described connection mechanism, it is preferable to install a lock mechanism that is operated by receiving the flow of liquid to suppress the release of the upstream-side end part and the downstream-side end part of the above-described membrane elements from each other.

As such a lock mechanism, it can include, for example, a structure in which a rotation blade that rotated by receiving the flow of liquid is installed in at least one of the upstream-side end part and the downstream-side end part, and a fixing engagement part that is engaged with the rotated rotation blade is installed in the other one. Also, it can include, for example, a structure in which a hook member that is pivoted to the downstream side by receiving the flow of liquid is installed in the upstream-side end part, and a fixing engagement part that is engaged with the pivoted hook member is installed in the downstream-side end part.

The invention claimed is:

1. A spiral membrane module in which a plurality of spiral membrane elements each formed in multiple layers by winding membranes and channel materials around a center tube having holes are received in a pressure vessel while being connected in series through the intermediary of connection mechanisms, wherein the connection mechanism has a movable member installed at either the upstream side end part or the downstream side end part of the membrane element and having an engagement part engageable with the other of the upstream side end or the downstream side end, and the movable member has a contact part coming into contact with the inner wall of the pressure vessel and locking the engagement by the engagement part.

2. The spiral membrane module according to claim 1, wherein the connection mechanism is provided with a release mechanism that releases the engagement by the engagement part in a state in which the contact part is not in contact with the inner wall.

3. The spiral membrane module according to claim 2, wherein the movable member is a lever member having a flexible part that releases the engagement by elastic restoration force.

4. The spiral membrane module according to claim 1, wherein the upstream side end part and the downstream side end part that are connected each have a guide inclination part that guides the engagement part of the movable member to the engagement part of the opposite side by relative rotation of the two.

5. The spiral membrane module according to claim 1, comprising, apart from the connection mechanism, a lock mechanism that is operated by receiving the flow of liquid so as to suppress the separation between the upstream side end part and the downstream side end part of the membrane elements.

6. A spiral membrane module comprising a plurality of spiral membrane elements, each of which spiral membrane elements comprises:
multiple layers of membranes and channel materials wound around a center tube having holes;
a movable member installed at either the upstream side end part or the downstream side end part of the membrane element; and
an engagement part engageable with the other of the downstream side end or the upstream side end, respectively, of the movable member of an adjacent spiral membrane element,
wherein said said plurality of spiral membrane elements are configured to be received by a pressure vessel while said said plurality of spiral membrane elements are connected in series through the engagement of the engagement part of one spiral membrane element with the movable member of an adjacent spiral membrane element, and wherein the movable member has a contact part coming into contact with the inner wall of the pressure vessel and locking the engagement by the engagement part.

7. The spiral membrane module according to claim 6, wherein the position of the engagement part of the connection mechanism can be changed relative to at least one of the upstream-side end part and the downstream-side end part of the spiral membrane element.

8. A spiral membrane element comprising:
multiple layers of membranes and channel materials wound around a center tube having holes;
a movable member installed at either the upstream side end part or the downstream side end part of the membrane element; and
an engagement part engageable with the other of the downstream side end or the upstream side end, respectively, of the movable member of an adjacent other spiral membrane element,
wherein said said spiral membrane element is configured to be received by a pressure vessel while said said spiral membrane element is connected in series to other spiral membrane elements through the engagement of the engagement part of said spiral membrane element with the movable member of an adjacent other spiral membrane element, and
wherein the movable member has a contact part coming into contact with the inner wall of the pressure vessel and locking the engagement by the engagement part.

9. The spiral membrane element according to claim 8, wherein the position of the engagement part of the connection mechanism can be changed relative to at least one of the upstream-side end part and the downstream-side end part of the spiral membrane element.

10. The spiral membrane element according to claim 8, wherein the connection mechanism is provided with a release mechanism that releases the engagement by the engagement part in a state in which the contact part is not in contact with the inner wall.

11. The spiral membrane element according to claim 8, wherein the movable member is a lever member having a flexible part that releases the engagement by elastic restoration force.

12. The spiral membrane element according to claim 8, wherein the upstream side end part and the downstream side end part that are connected each have a guide inclination part that guides the engagement part of the movable member to the engagement part of the opposite side by relative rotation of the two.

13. The spiral membrane element according to claim 8, comprising, apart from the connection mechanism, a lock mechanism that is operated by receiving the flow of liquid so as to suppress the separation between the upstream side end part and the downstream side end part of the membrane elements.

* * * * *

UNITED STATES PATENT AND TRADEMARK OFFICE
CERTIFICATE OF CORRECTION

| | |
|---|---|
| PATENT NO. | : 8,034,241 B2 |
| APPLICATION NO. | : 12/158654 |
| DATED | : October 11, 2011 |
| INVENTOR(S) | : Masashi Beppu et al. |

It is certified that error appears in the above-identified patent and that said Letters Patent is hereby corrected as shown below:

At Column 2, line 26, please change "2;" to --2:--.

At Column 2, line 62, please change "looking" to --locking--.

At Column 12, line 64, in Claim 6, please change "said said" to --said--.

At Column 12, line 66, in Claim 6, please change "said said" to --said--.

At Column 13, line 21, in Claim 8, please change "said said" to --said--.

At Column 13, line 22, in Claim 8, please change "said said" to --said--.

Signed and Sealed this
Twelfth Day of June, 2012

David J. Kappos
*Director of the United States Patent and Trademark Office*